US006687338B2

(12) United States Patent
Seligmann

(10) Patent No.: US 6,687,338 B2
(45) Date of Patent: Feb. 3, 2004

(54) CALL WAITING NOTIFICATION

(75) Inventor: Doree Duncan Seligmann, New York, NY (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 10/187,100

(22) Filed: Jul. 1, 2002

(65) Prior Publication Data

US 2004/0001574 A1 Jan. 1, 2004

(51) Int. Cl.[7] .......................... H04M 1/64; H04M 11/00; H04M 3/42
(52) U.S. Cl. ................. 379/88.01; 379/88.02; 379/88.5; 379/88.06; 379/88.07; 379/88.12; 379/93.35; 379/215.01
(58) Field of Search .................... 379/88.01, 88.02, 379/88.03, 88.04, 88.05, 88.06, 88.12, 88.25, 93.35, 142.08, 215.01, 88.13, 88.17, 88.07, 265.01, 288.09; 704/246, 270, 272, 278, 501, 502

(56) References Cited

U.S. PATENT DOCUMENTS 5,652,789 A * 7/1997 Miner et al. ................ 379/201
5,752,230 A * 5/1998 Alonso-Cedo ............... 704/270
5,850,435 A * 12/1998 Devillier .................... 379/374
5,911,129 A * 6/1999 Towell ....................... 704/272
5,946,386 A * 8/1999 Rogers et al. ............... 379/265
6,018,710 A * 1/2000 Wynblatt et al. ............ 704/260
6,035,273 A * 3/2000 Spies ......................... 704/270

* cited by examiner

Primary Examiner—Allan Hoosain
(74) Attorney, Agent, or Firm—DeMont & Breyer, LLC

(57) ABSTRACT

A technique for notifying a person who is engaged in a telephone call with a second person that a third person is calling him or her is disclosed. The notification comprises not a series of beeps but a voice—synthetically generated or pre-recorded—that has at least one different psychoacoustic characteristic than the voice of the second person. By using a notification that is psychoacoustically different than the voice of the second person, the ability of the first person to simultaneously perceive and understand the notification and the voice of the second person is enhanced. Example psychoacoustic characteristics of a voice include, but are not limited to, the gender of the speaker's voice (i.e., male or female), the natural language of the speaker's voice (e.g., English, Spanish, French, etc.), and the smoothness of the speaker's voice (e.g., silky or raspy, etc.).

20 Claims, 7 Drawing Sheets

CALL WAITING NOTIFICATION

FIELD OF THE INVENTION

The present invention relates to telecommunications in general, and, more particularly, to a technique for notifying a person who is engaged in a telephone call with a second person that a third person is calling him or her.

BACKGROUND OF THE INVENTION

A popular feature of modem telecommunications systems is "call waiting." Without call waiting, a person who was engaged in a telephone call with a second person did not know when a third person was calling him or her. In contrast, with call waiting, a person who is engaged in a telephone call does, in fact, know when a third party is calling.

In accordance with a typical call waiting system, the telecommunications system notifies the first person that a third person is calling by injecting a series of beeps into his or her ear. This is accomplished by generating and injecting the beeps into the audio channel from the second person. Upon hearing the beeps, the first person can either ignore the incoming call or can put the current call on hold and switch to the incoming call.

Although call waiting is popular and convenient, the method of notification is disadvantageous in that it often drowns out the voice of the second person. This is intrusive and disruptive and somewhat eliminates the overall advantage of call waiting in the first place.

Therefore, the need exists for a less intrusive and disruptive technique for notifying a person who is engaged in a telephone call with a second person that a third person is calling him or her.

SUMMARY OF THE INVENTION

The present invention provides a technique for notifying a person who is engaged in a telephone call with a second person that a third person is calling him or her without some of the costs and disadvantages for doing so in the prior art. In particular, the illustrative embodiments notify the person of the arrival of a message (e.g., a telephone call, a fax, an e-mail, etc.) not with a series of beeps but with a voice—synthetically generated or pre-recorded—that has at least one different psychoacoustic characteristic than the voice of the second person. By using a notification that is psychoacoustically different than the voice of the second person, the illustrative embodiments facilitate the ability of the first person to simultaneously perceive and understand the notification and the voice of the second person.

For the purposes of this specification, a "psychoacoustic" characteristic of a voice is defined as a quality of a voice that facilitates the ability of a listener to perceive and understand one voice at the same time as another. A psychoacoustic characteristic of a voice is not, therefore, necessarily the same as a voiceprint characteristic, which seeks to identify a voice or to distinguish one voice from another. Rather, a psychoacoustic characteristic of a voice is a quality of a voice that affects the perception of that voice. Example psychoacoustic characteristics of a voice include, but are not limited to, the gender of the speaker's voice (i.e., male or female), the natural language of the speaker's voice (e.g., English, Spanish, French, etc.), the smoothness of the speaker's voice (e.g., silky or raspy, etc.), the frequency range of the speaker's voice (e.g., soprano, alto, contralto, tenor, baritone, bass, etc.), hurried versus relaxed, pleasant vs. dissonant, agitated versus, calm, etc. For example, if the second person's voice sounds "male" (i.e., has the psychoacoustic characteristic of "maleness"), then a notification that sounds "female" (i.e., has the psychoacoustic characteristic of "femaleness") will be less disruptive to a listener than a notification than sounds "male."

The illustrative embodiments of the present invention comprise: a receiver for receiving an incoming message for a first person, wherein the incoming message arrives while the first person is engaged in a telephone call with a second person; and a processor for estimating a first psychoacoustic characteristic of the second person's voice and for notifying the first person to the arrival of the incoming message with a voice that is different in the first psychoacoustic characteristic than the second person's voice.

DETAILED DESCRIPTION

Figure 1:
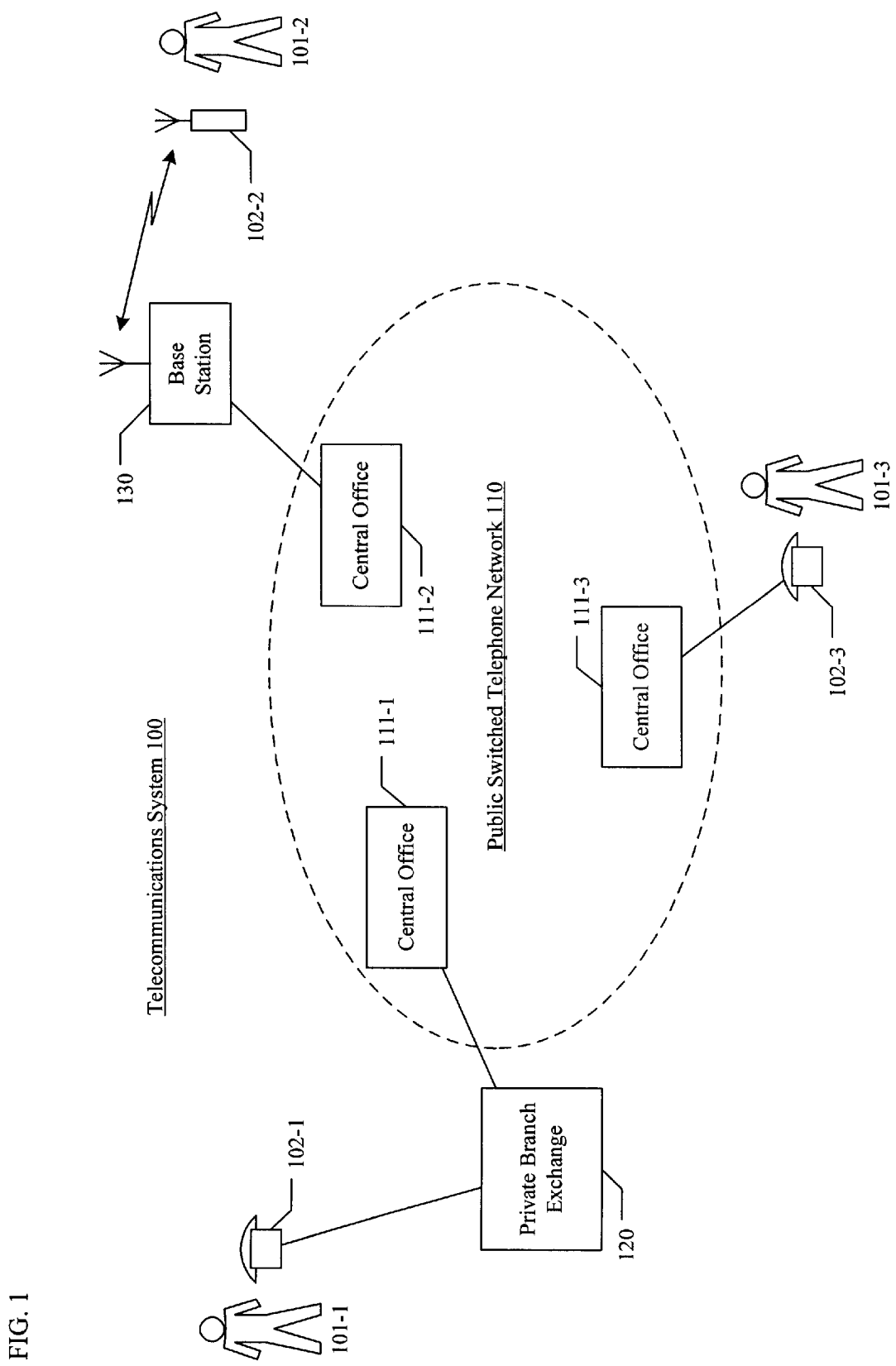
FIG. 1 depicts a schematic diagram of the salient components of a telecommunications system in accordance with the illustrative embodiments of the present invention.

FIG. 1 depicts a schematic diagram of the salient components of a telecommunications system in accordance with the illustrative embodiments of the present invention. Telecommunications system 100 comprises: people 101-1 through 101-3, telephones 102-1 through 102-3 associated with people 101-1 through 101-3, respectively, public switched telephone network 110, central offices 111-1 through 111-3, private branch exchange 120, and cellular base station 130, interconnected as shown.

In accordance with the illustrative embodiments, person 101-1 has access to public switched telephone network 110 via wireline telephone 102-1 and private branch exchange ("PBX") 120. It will be clear to those skilled in the art, however, after reading this specification, how to make and use alternative embodiments of the present invention in which person 101-1 has access to public switched telephone network 110 directly via a wireline telephone or via a wireless telephone (e.g., a cellular telephone, a two-way pager, a personal digital assistant, etc.).

In accordance with the illustrative embodiments, person 101-2 has access to public switched telephone network 110 via wireline telephone 102-2. It will be clear to those skilled in the art, however, after reading this specification, how to make and use alternative embodiments of the present invention in which person 101-2 has access to public switched telephone network 110 via a private branch exchange or via a wireless telephone.

In accordance with the illustrative embodiments, person 101-3 has access to public switched telephone network 110 via wireless telephone 102-3, which is connected to public switched telephone network 110 via cellular base station 130. It will be clear to those skilled in the art, however, after reading this specification, how to make and use alternative embodiments of the present invention in which person 101-3 has access to public switched telephone network 110 via a wireline telephone or via a private branch exchange.

In accordance with the illustrative embodiments, people 101-1, 101-2, and 101-3 engage in telephone calls via public switched telephone network 110. It will be clear to those skilled in the art, however, after reading this specification, how to make and use embodiments of the present invention in which some or all of people 101-1, 101-2, and 101-3 communicate via a different network (e.g., the Internet, an intranet, a private telecommunications network, a cellular or other wireless network, etc.). Furthermore, it will be clear to those skilled in the art, after reading this specification, how to make and use embodiments of the present invention in which person 101-3 sends a text message, data message, voice-mail message, or a video message to person 101-1 that does not require the immediate attention of person 101-1 (i.e., that does not require that person 101-1 and person 101-3 have a real-time interactive conversation). And still furthermore, it will be clear to those skilled in the art, after reading this specification, how to make and use embodiments of the present invention in which various telecommunications terminals other than telephones (e.g., personal digital assistants, two-way pagers, video terminals, etc.) are used by some or all of people 101-1, 101-2, and 101-3.

In accordance with the first illustrative embodiment, the present invention resides solely in telephone 101-1. In accordance with the second illustrative embodiment, the present invention resides solely in private branch exchange 120, and in accordance with the third illustrative embodiment, the present invention resides solely in public switched telephone network 110. It will be clear to those skilled in the art, however, after reading this specification, how to make and use embodiments of the present invention that reside elsewhere (e.g., in any combination of a telephone, a private branch exchange, and the public switched telephone network, etc.).

Figure 2:
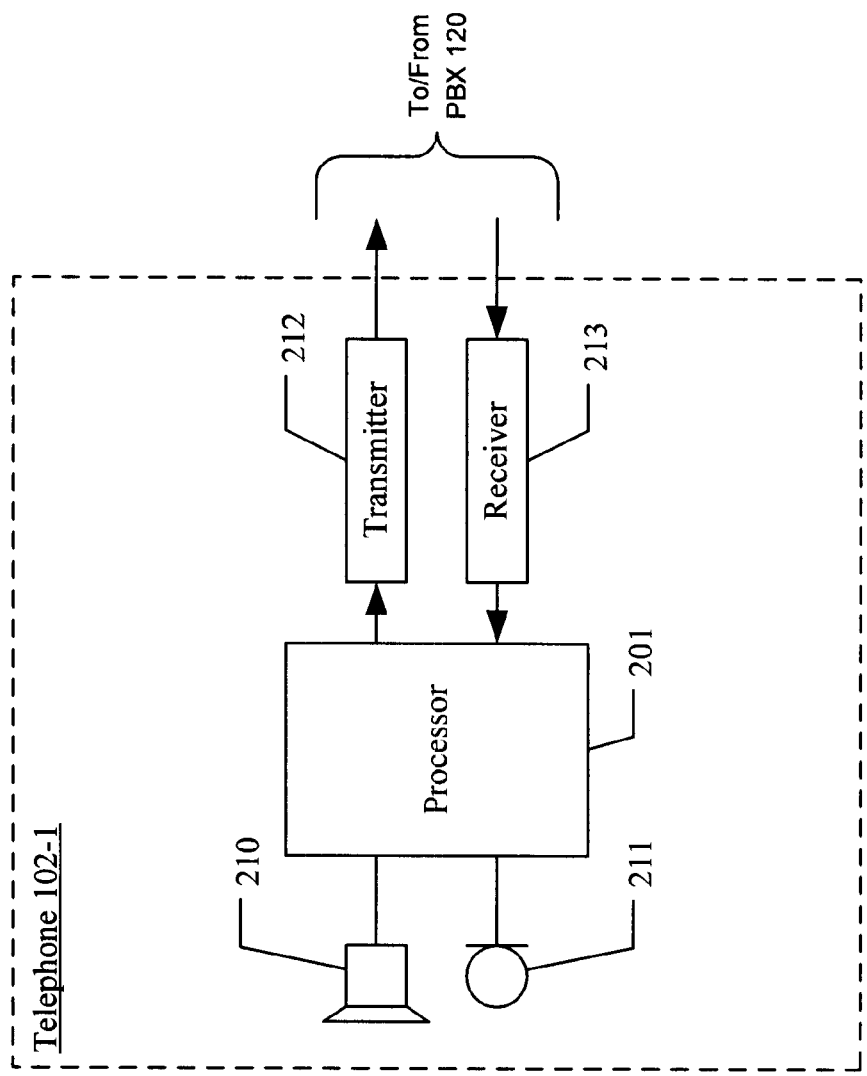
FIG. 2 depicts a block diagram of the first illustrative embodiment, in which the present invention resides solely in telephone 102-1.

FIG. 2 depicts a block diagram of the first illustrative embodiment, in which the present invention resides solely in telephone 102-1. Telephone 102-1 is hand-held telephone, but it will be clear to those skilled in the art how, after reading this specification, to make and use alternative embodiments of the present invention in which telephone 102-1 is a hands-free terminal or a data terminal or both.

Telephone 102-1 comprises: processor 201, speaker 210, microphone 211, transmitter 212, and receiver 213, interconnected as shown.

Processor 201 is a programmed general-purpose processor that is capable of performing all of the functionality described below and with respect to FIG. 3. It will be clear to those skilled in the art, however, after reading this specification, how to make and use alternative embodiments of the present invention in which processor 201 is a "hardwired" or special-purpose processor.

Speaker 210 is an electro-acoustic transducer that converts information-bearing electromagnetic signals representing sound into sound for person 101-1. It will be clear to those skilled in the art how to make and use speaker 210.

Microphone 211 is an electro-acoustic transducer that converts sound into information-bearing electromagnetic signals for processor 201. It will be clear to those skilled in the art how to make and use microphone 211.

Transmitter 212 comprises the circuitry that enables telephone 102-1 to transmit information-bearing electromagnetic signals to private branch exchange 120. It will be clear to those skilled in the art how to make and use transmitter 212.

Receiver 213 comprises the circuitry that enables telephone 102-1 to receive electromagnetic signals from private branch exchange 120. In particular, receiver 213 is capable of receiving a plurality of disparate information-bearing signals (e.g., telephone calls, text messages, video calls, etc.) simultaneously. It will be clear to those skilled in the art how to make and use receiver 213.

Figure 3:
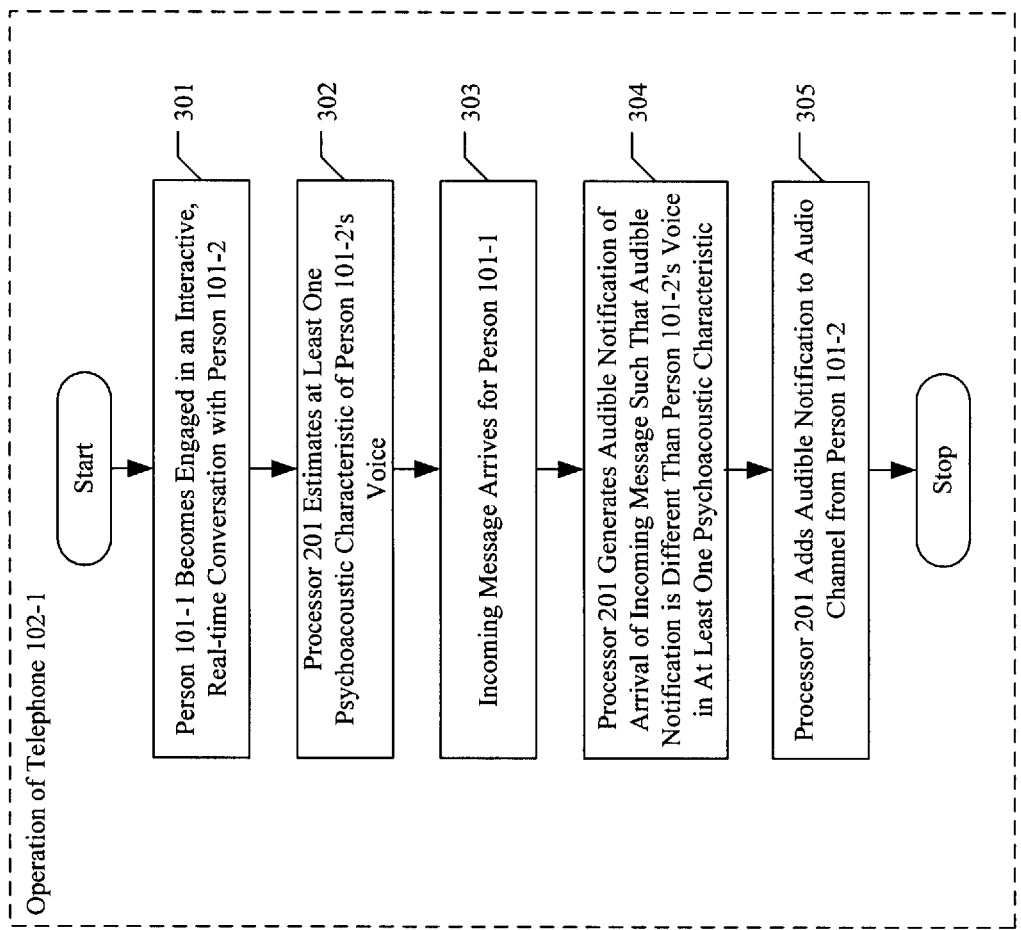
FIG. 3 depicts a flowchart of the operation of telephone 102-1 in accordance with the first illustrative embodiment.

FIG. 3 depicts a flowchart of the operation of telephone 102-1 in accordance with the first illustrative embodiment.

At event 301, person 101-1 becomes engaged in a real-time, interactive conversation (e.g., a telephone call, a video conference, an instant message session, etc.) with person 101-2, which conversation is connected through telephone 102-1, private branch exchange 120, public switched telephone network 110, and telephone 102-2. The salient characteristic of this conversation is that the voice of person 101-2 is heard by person 101-1.

At event 302, processor 201 in telephone 102-1 estimates, using well-known signal processing techniques, at least one psychoacoustic characteristic of person 101-2's voice. Other psychoacoustic characteristics might include: young vs. old, angry vs. happy, and exasperated versus patient. It will be clear to those skilled in the how to make estimate one or more psychoacoustic characteristics of person 101-2's voice.

At event 303, and while person 101-1 is engaged in a real-time, interactive conversation with person 101-2, an incoming message (e.g., a telephone call, an e-mail, a video conference call, an instant message, etc.) arrives at receiver 213 for person 101-1. In accordance with the first illustrative embodiment, the incoming message is from person 101-3. It will be clear to those skilled in the art, however, that in some alternative embodiments of the present invention the incoming message might originate not from a person, but rather from a computer.

At event 304, processor 201 prepares to notify person 101-1 of the arrival of the incoming message from person 101-3 and generates a verbal, audible notification that is different from person 101-2's voice in at least one psychoacoustic characteristic. For example, when processor 201 at event 302 estimates that person 101-2's voice is female, processor 201 at event 304 might generate a notification that sounds male. Processor 201 can synthesize the notification with the appropriate psychoacoustic characteristics, or, alternatively, can select the notification from a collection of pre-recorded notifications with differing psychoacoustic characteristics.

The notification can be general in content (e.g., "A message has just arrived for you," etc.) or more specific (e.g., "Dr. Marza has R.S.V.P'd to your dinner invitation," etc.) and can, for example, be based on the information in the message.

The nature of the incoming message might necessitate that person 101-1 halt or suspend the conversation with person 101-2—when, for example, it was a telephone call—or, alternatively, the incoming message might not necessitate that person 101-1 halt or suspend the conversation with person 101-2—when, for example, it was an e-mail. This reflects the fact that some incoming messages need to be addressed immediately while others do not.

When person 101-1 is bilingual or multilingual, that information is provided to processor 201, and, therefore, processor 201 can generate the notification that is in a different natural language than spoken by person 101-2.

At event 305, processor 201 provides person 101-1 with the notification generated at event 304 by injecting it the audio channel from person 101-2, which is then output via speaker 210.

It will be clear to those skilled in the art, after reading this specification, how to make and use telephones in accordance with the present invention.

Figure 4:
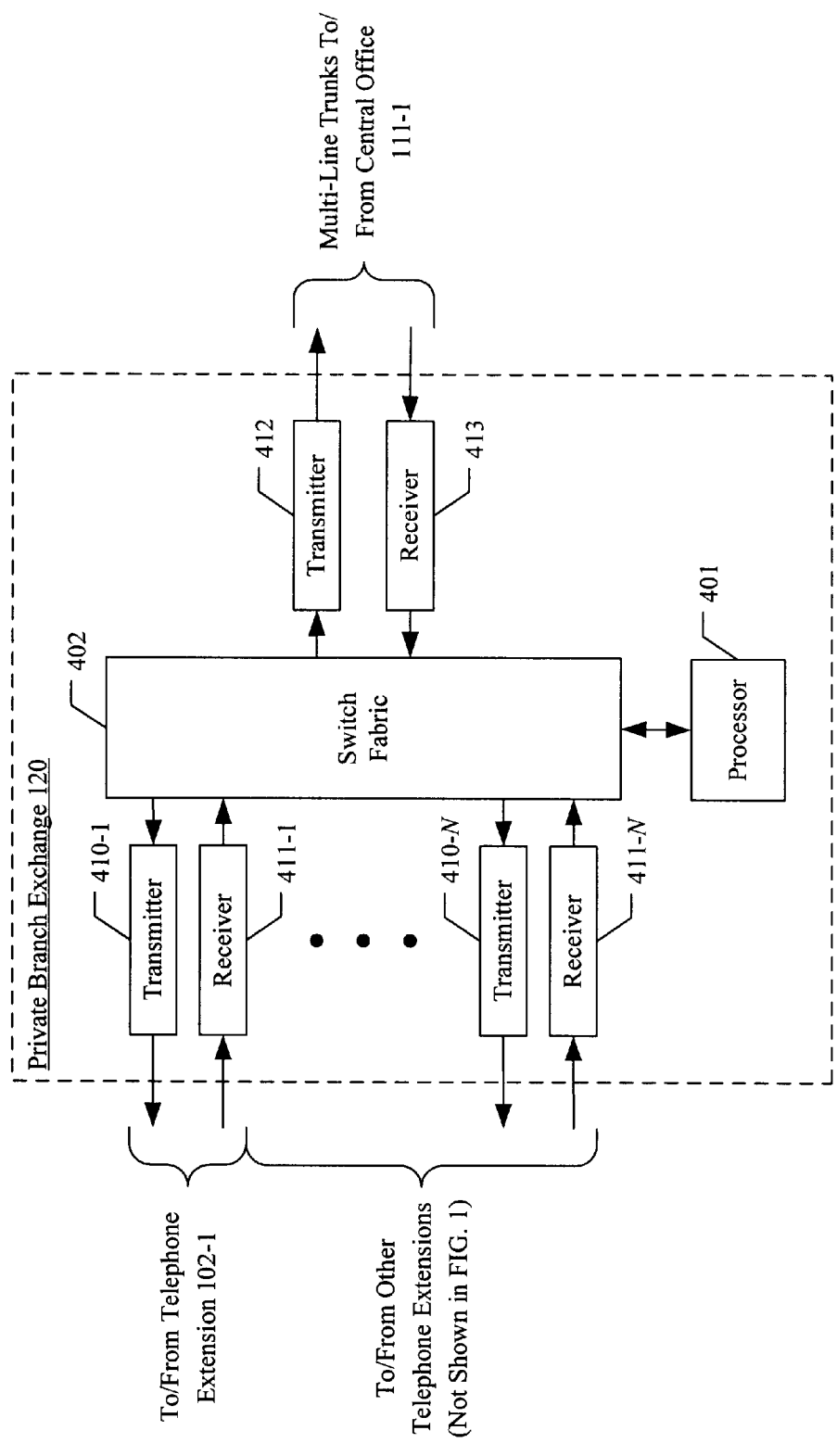
FIG. 4 depicts a block diagram of the second illustrative embodiment, in which the present invention resides solely in private branch exchange 120.

FIG. 4 depicts a block diagram of the second illustrative embodiment, in which the present invention resides solely in private branch exchange 120. Private branch exchange 120 comprises: switch fabric 402, processor 401, transmitter 412, receiver 413, and N pairs of transmitters and receivers—transmitters 410-1 through 410-N and receivers 411-1 through 411-N—interconnected as shown, wherein N is a positive integer.

Switch fabric 402 enables private branch exchange 120 to establish a telephone call between one or more extension telephones (e.g., telephone 102-1, etc.) and public switched telephone network 110. It will be clear to those skilled in the art how to make and use switch fabric 402.

Processor 401 is a programmed general-purpose processor that is capable of performing all of the functionality described below and with respect to FIG. 5. It will be clear to those skilled in the art, however, after reading this specification, how to make and use alternative embodiments of the present invention in which processor 401 is a "hardwired" or special-purpose processor.

Transmitter 412 comprises the circuitry that enables private branch exchange 120 to transmit information-bearing electromagnetic signals to public switched telephone network 110. It will be clear to those skilled in the art how to make and use transmitter 412.

Receiver 413 comprises the circuitry that enables private branch exchange 120 to receiving information-bearing electromagnetic signals from public switched telephone network 110. It will be clear to those skilled in the art how to make and use receiver 413.

Transmitter 410-i, for i=1 to N, comprises the circuitry that enables private branch exchange 120 to transmit information-bearing electromagnetic signals to telephone extension 102-i. It will be clear to those skilled in the art how to make and use transmitter 410-i.

Receiver 411-i comprises the circuitry that enables private branch exchange to receive information-bearing electromagnetic signals from telephone extension 102-i. It will be clear to those skilled in the art how to make and use receiver 411-i.

Figure 5:
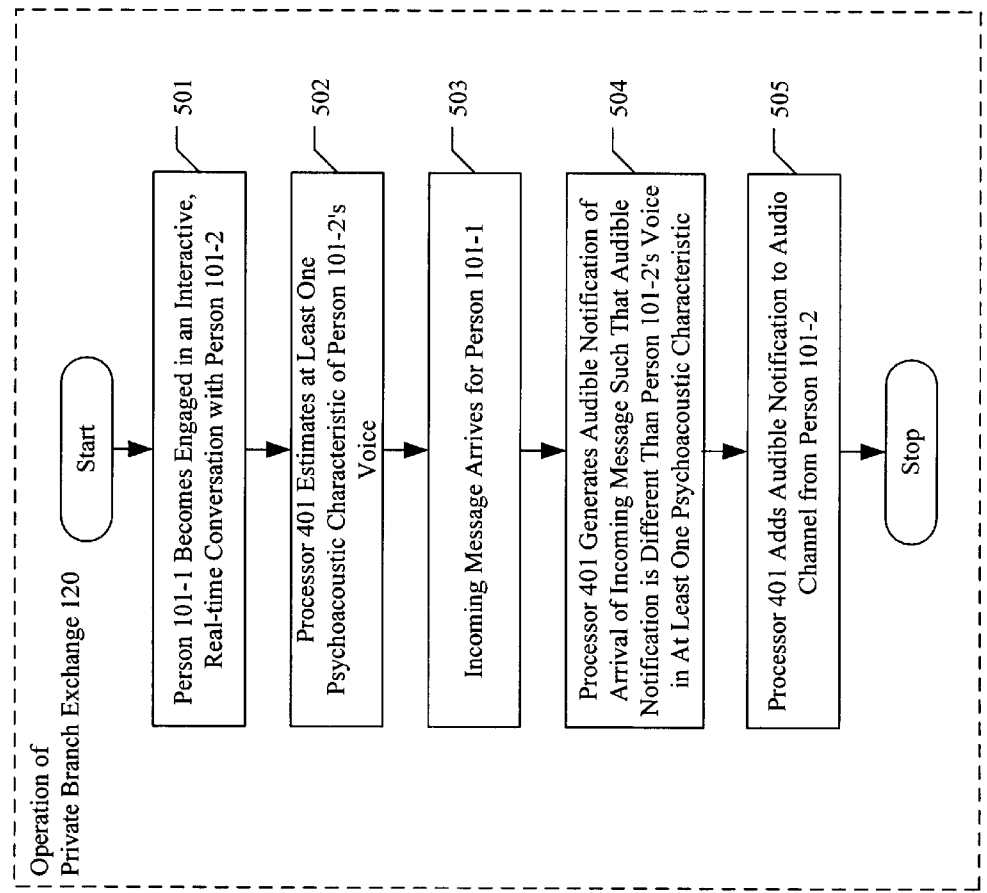
FIG. 5 depicts a flowchart of the operation of private branch exchange 120 in accordance with the second illustrative embodiment.

FIG. 5 depicts a flowchart of the operation of private branch exchange 120 in accordance with the second illustrative embodiment.

At event 501, person 101-1 becomes engaged in a real-time, interactive conversation with person 101-2, which conversation is connected through telephone 102-1, private branch exchange 120, public switched telephone network 110, and telephone 102-2. The salient characteristic of this conversation is that the voice of person 101-2 is heard by person 101-1.

At event 502, processor 401 in private branch exchange 120 estimates, using well-known signal processing techniques, at least one psychoacoustic characteristic of person 101-2's voice. The tasks that processor 401 uses in accomplishing event 502 can be identical to those that processor 201 uses in performing event 302.

At event 503, and while person 101-1 is engaged in a real-time, interactive conversation with person 101-2, an incoming message from person 101-3 arrives at receiver 413 for person 101-1. In accordance with the second illustrative embodiment, the incoming message is from person 101-3. It will be clear to those skilled in the art, however, that in some alternative embodiments of the present invention the incoming message might originate not from a person, but rather from a computer.

At event 504, processor 201 prepares to notify person 101-1 of the arrival of the incoming message from person 101-3 and generates a verbal, audible notification that is different from person 101-2's voice in at least one psychoacoustic characteristic. The tasks that processor 401 uses in performing event 504 can be identical to those that processor 201 uses in performing event 504.

At event 505, processor 201 provides person 101-1 with the notification generated at event 504 by injecting it the audio channel from person 101-2, which is then output via speaker 210. It will be clear to those skilled in the art, after reading this specification, how to make and use private branch exchanges in accordance with the present invention.

Figure 6:
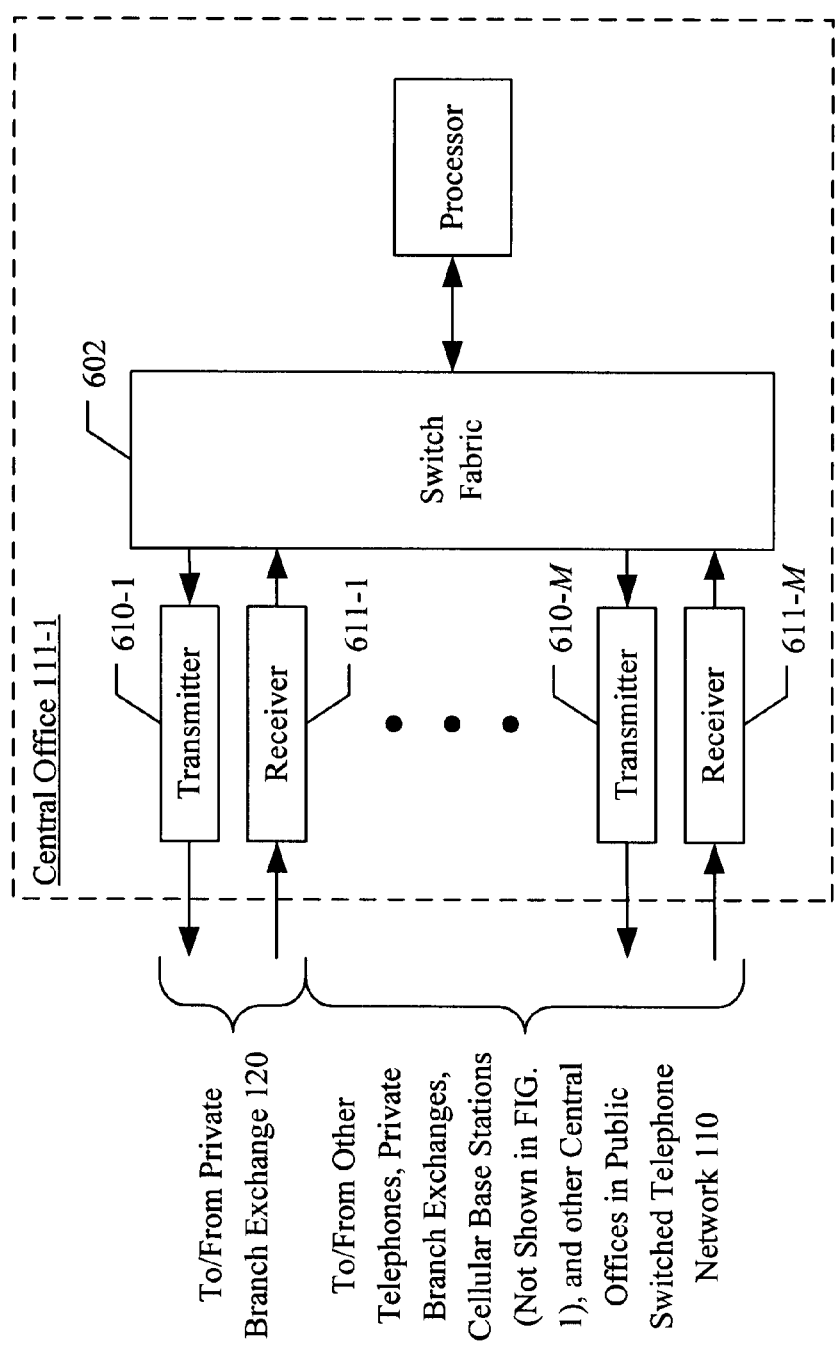
FIG. 6 depicts a block diagram of the third illustrative embodiment, in which the present invention resides solely in central office 111-1.

FIG. 6 depicts a block diagram of the third illustrative embodiment, in which the present invention resides solely in central office 111-1. Central office 111-1 comprises: switch fabric 602, processor 601, M pairs of transmitters and receivers—transmitters 610-1 through 610-M and receivers 411-1 through 411-M—interconnected as shown, wherein M is a positive integer.

Switch fabric 602 enables central office 111-1 to establish a telephone call between one or more telephones, private branch exchanges, cellular base stations, and other central offices in public switched telephone network 110. It will be clear to those skilled in the art how to make and use switch fabric 402.

Processor 601 is a programmed general-purpose processor that is capable of performing all of the functionality described below and with respect to FIG. 7. It will be clear to those skilled in the art, however, after reading this specification, how to make and use alternative embodiments of the present invention in which processor 601 is a "hardwired" or special-purpose processor.

Transmitter 610-1 comprises the circuitry that enables central office 111-1 to transmit information-bearing electromagnetic signals to private branch exchange 120. It will be clear to those skilled in the art how to make and person transmitter 610-1.

Receiver 611-1 comprises the circuitry that enables central office 111-1 to receive information-bearing electromagnetic signals from private branch exchange 120. It will be clear to those skilled in the art how to make and use receiver 611-1.

Transmitter 610-j, for j=2 to N, comprises the circuitry that enables central office 111-1 to transmit information-bearing electromagnetic signals to telephones, private branch exchanges, cellular base stations, and other central offices in public switched telephone network 110. It will be clear to those skilled in the art how to make and use transmitter 610-j.

Receiver 611-j comprises the circuitry that enables central office 111-1 to receive information-bearing electromagnetic signals from telephones, private branch exchanges, cellular base stations, and other central offices in public switched telephone network 110. It will be clear to those skilled in the art how to make and use receiver 611-j.

Figure 7:
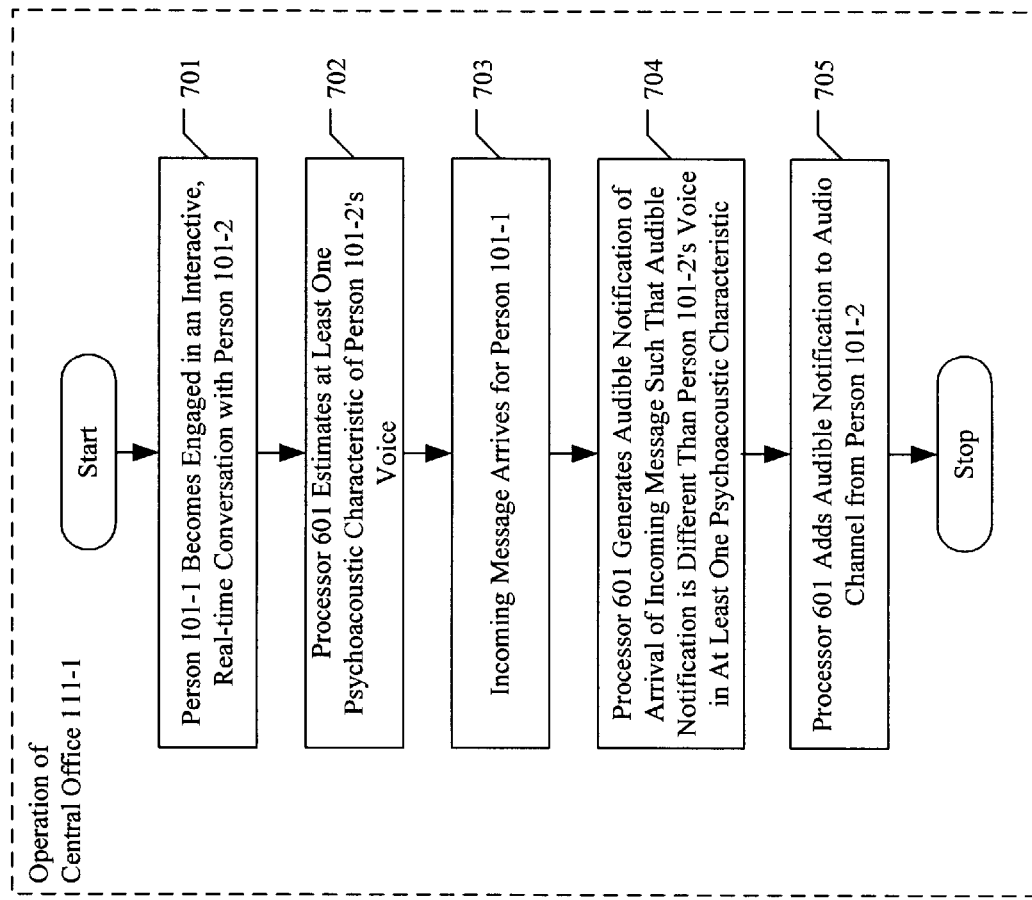
FIG. 7 depicts a flowchart of the operation of central office 111-1 in accordance with the third illustrative embodiment.

FIG. 7 depicts a flowchart of the operation of central office 111-1 in accordance with the third illustrative embodiment.

At event 701, person 101-1 becomes engaged in a real-time, interactive conversation with person 101-2, which conversation is connected through telephone 102-1, private branch exchange 120, public switched telephone network 110, and telephone 102-2. The salient characteristic of this conversation is that the voice of person 101-2 is heard by person 101-1.

At event 702, processor 601 in central office 111-1 estimates, using well-known signal processing techniques, at least one psychoacoustic characteristic of person 101-2's voice. The tasks that processor 601 uses in performing event 702 can be identical to those that processor 201 uses in performing event 302.

At event 703, and while person 101-1 is engaged in a real-time, interactive conversation with person 101-2, an incoming message from person 101-3 arrives at receiver 610-j for person 101-1. In accordance with the third illustrative embodiment, the incoming message is from person 101-3. It will be clear to those skilled in the art, however, that in some alternative embodiments of the present invention the incoming message might originate not from a person, but rather from a computer.

At event 704, processor 601 prepares to notify person 101-1 of the arrival of the incoming message from person 101-3 and generates a verbal, audible notification that is different from person 101-2's voice in at least one psychoacoustic characteristic. The tasks that processor 601 uses in performing event 704 can be identical to those that processor 201 uses in performing event 504.

At event 705, processor 601 provides person 101-1 with the vocal notification generated at event 704 by injecting it into the audio channel with the sound from person 101-2.

It will be clear to those skilled in the art, after reading this specification, how to make and use central offices in accordance with present invention.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
   a receiver for receiving an incoming message for a first person, wherein said incoming message arrives while said first person is engaged in a telephone call with a second person; and
   a processor for estimating a first psychoacoustic characteristic of said second person's voice and for notifying said first person to the arrival of said incoming message with a voice that is different in said first psychoacoustic characteristic than said second person's voice.

2. The apparatus of claim 1 wherein said first psychoacoustic characteristic is gender.

3. The apparatus of claim 1 wherein said first psychoacoustic characteristic is language.

4. The apparatus of claim 1 wherein said processor is also for estimating a second psychoacoustic characteristic of said second person's voice and for notifying said first person to the arrival of said incoming message with a voice that is different in said second psychoacoustic characteristic than said second person's voice.

5. The apparatus of claim 4 wherein said first psychoacoustic characteristic is gender and said second psychoacoustic characteristic is pitch.

6. The apparatus of claim 1 wherein said incoming message is a second telephone call.

7. The apparatus of claim 1 wherein said incoming message is a text message.

8. The apparatus of claim 1 wherein said apparatus is a cellular telephone.

9. The apparatus of claim 1 wherein said apparatus is a private branch exchange.

10. The apparatus of claim 1 wherein said apparatus is a central office switch.

11. An apparatus comprising:
    a receiver for receiving a first telephone call for a first person, wherein said first telephone call arrives while said first person is engaged in a second telephone call with a second person; and
    a processor for estimating the gender of said second person based on the voice characteristics of said second person's voice, and for notifying said first person to the arrival of said first telephone call with a voice that has the opposite gender of said second person.

12. The apparatus of claim 11 wherein said processor is also for estimating the language of said second person based on the voice characteristics of said second person's voice, and for notifying said first person to the arrival of said first telephone call with a voice in a different language than that of said second person.

13. The apparatus of claim 11 wherein said processor is also for estimating the volume of said second person's voice based, and for notifying said first person to the arrival of said first telephone call with a voice that is quieter than the volume of said second person's voice.

14. The apparatus of claim 11 wherein said processor is also for estimating the frequency range of said second person's voice, and for notifying said first person to the arrival of said first telephone call with a voice that has a substantially different frequency range than said first person's voice.

15. A private branch exchange comprising:
    a receiver for receiving an incoming message for a first person, wherein said incoming message arrives while said person is engaged in a telephone call with a second person; and
    a processor for estimating a plurality of psychoacoustic characteristics of said second person's voice and for notifying said first person to the arrival of said incoming message with a voice that is different to each of said psychoacoustic characteristics of said second person's voice.

16. The private branch exchange of claim 15 wherein said first psychoacoustic characteristic is gender.

17. The private branch exchange of claim 15 wherein said first psychoacoustic characteristic is language.

18. The private branch exchange of claim 15 wherein said processor is also for estimating a second psychoacoustic characteristic of said second person's voice and for notifying said first person to the arrival of said incoming message with a voice that is different in said second psychoacoustic characteristic than said second person's voice.

19. The private branch exchange of claim 15 wherein said incoming message is a second telephone call.

20. The private branch exchange of claim 15 wherein said incoming message is a text message.

* * * * *